June 18, 1940.  E. B. HUDSON  2,204,858

BUTT WELDING MACHINE

Filed Oct. 27, 1938  4 Sheets-Sheet 1

Inventor
EDWIN B. HUDSON.
By Allen & Allen
Attorneys.

Inventor
EDWIN B. HUDSON.
By Allen & Allen
Attorneys.

Inventor
EDWIN B. HUDSON.
By Allen & Allen
Attorneys.

Patented June 18, 1940

2,204,858

UNITED STATES PATENT OFFICE 2,204,858

BUTT WELDING MACHINE

Edwin B. Hudson, Middletown, Ohio, assignor to The American Rolling Mill Company, Middletown, Ohio, a corporation of Ohio Application October 27, 1938, Serial No. 237,286

9 Claims. (Cl. 219—4)

This invention relates to butt welding machines, and more particularly to machines for welding metal strip end to end to form longer coils of materials. Longer coils of materials are desirable in connection with further processing involving pickling and cold rolling and the like, since an improved product can be provided at a lower cost. At the present time the modern type strip mills are producing coils of great length, but even so, it is desirable to weld such coils end to end since the only limit in coil size is the material handling equipment. Available electric butt welding machines are not particularly well adapted for welding strip since such machines have been designed along more or less conventional lines as used in the automotive industry.

In the welding of strip up to 90 inches in width the welding machine must be placed in line with the decoilers, picklers, coilers and the like, and the strip becomes difficult to handle. A conventional welding machine of sufficient capacity to weld, for example, a 90 inch strip one-eighth of an inch thick is extremely heavy and expensive on account of the tremendous force necessary to push up a weld having such a large cross sectional area. In such machines one of the reasons for the tremendous weight is the fact that the hydraulic cylinders which are provided for the push up are located from eight to ten inches below the line of weld whereby high eccentric loads are caused and the machines must be given sufficient strength to take the extremely high flexure loads, all of which means increased weight. Another difficulty with conventional welders is that it has been found impracticable to install rigid end gauges to properly space the welding gap. Movable gauges have been used but these are not entirely satisfactory, not only because insufficient strength is available, but also because it is practically impossible for the welder to observe whether the strip has made proper contact with the end gauge.

In the conventional welder after the work has been clamped and the gauge removed the movable strip end approaches the stationary strip end in a horizontal plane during the welding cycle and the center of push up force is from eight to ten inches below the strip.

It is an object of my invention to overcome the difficulties discussed above by providing a rigid gauge for spacing the welding gap whereby proper spacing of the strip ends is assured. Another object of my invention is to provide a lighter machine in which the welding operation is accomplished by a movement of the strip ends in a direction transverse to the plane of the strip. A further object of my invention is to provide such a welder in which the welding electrodes move downwardly with the strip in an angular direction and toward each other at the same rate during the welding cycle. Other objects of my invention include the provision of a welder such that when the electrodes and clamping jaws are in the receiving position, the fixed gauge obstructs passage of the strip through the machine whereby the relative positioning of the strip ends is greatly facilitated, and to provide a machine in which the actual ends of the strip can be observed in gauge position before the welding operation has started.

These and other objects of my invention which will be described in more detail hereinafter or which will be apparent to one skilled in the art upon reading these specifications, I accomplish by that certain construction and arrangement of parts of which I shall now describe an exemplary embodiment. Reference is now made to the drawings forming a part hereof and in which.

Figs. 4 to 10 inclusive are diagrammatic views of the clamping jaws, strip, and the gauge during various phases of the welding cycle.

Briefly in the practice of my invention I depart from the conventional machine in that the strip ends are brought squarely against a rigid gap spacing gauge in a horizontal plane above the plane of normal strip travel. The gauge is of tapered formation and at the start of the welding cycle the strip ends after having been clamped, travel downwardly at the same speed along converging paths, so that during the early part of the downward movement of the strip ends, they clear the gauge. Thereupon the welding transformer is energized, causing arcing across the gap whereby the strip ends are heated. When the strip ends reach the intersection of their converging paths contact is made and after passing this point the push up to complete the weld is achieved below the normal line of strip travel.

Figure 1:
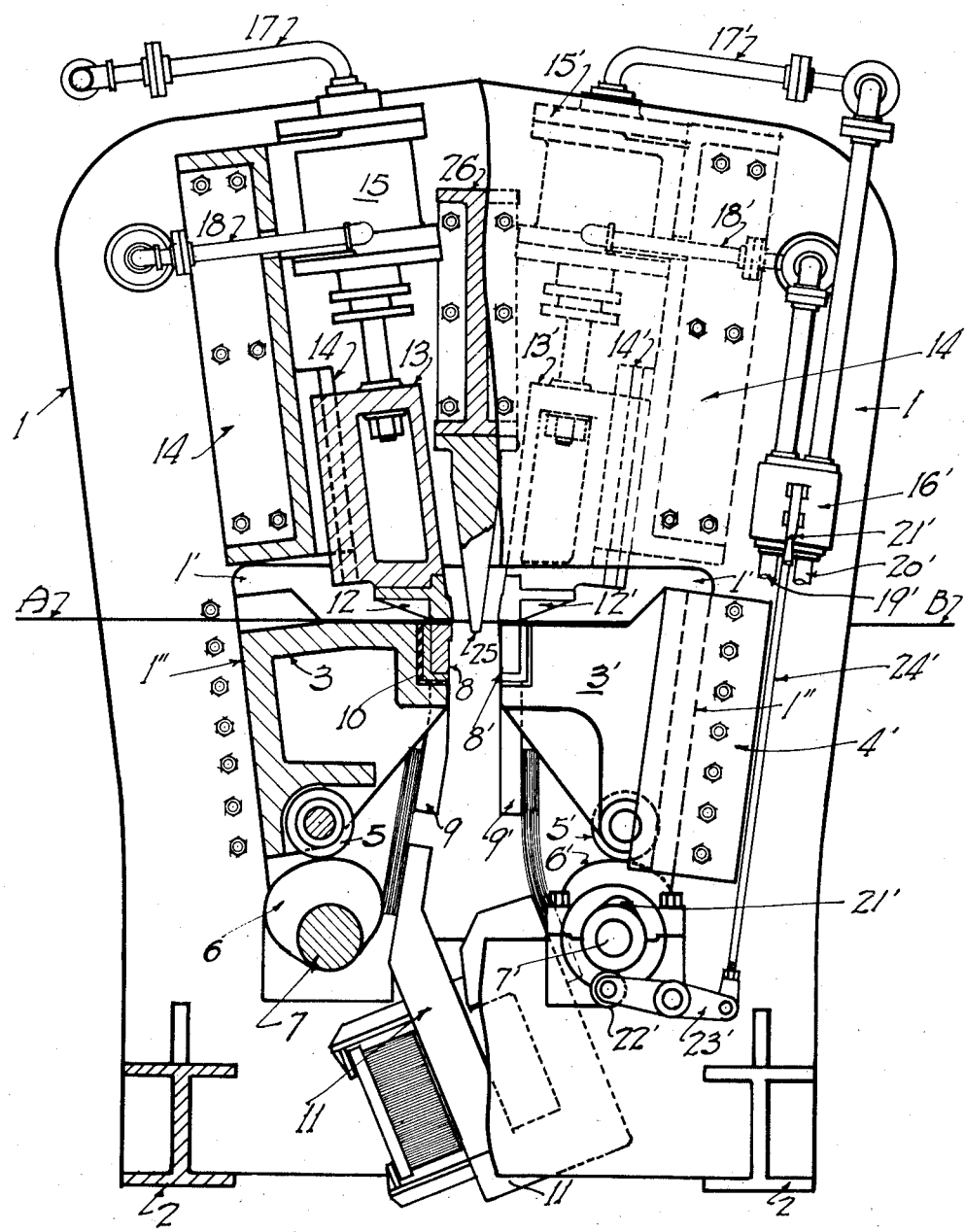
Figure 1 is an elevation partly in section of the machine on the operating side.
Figure 2:
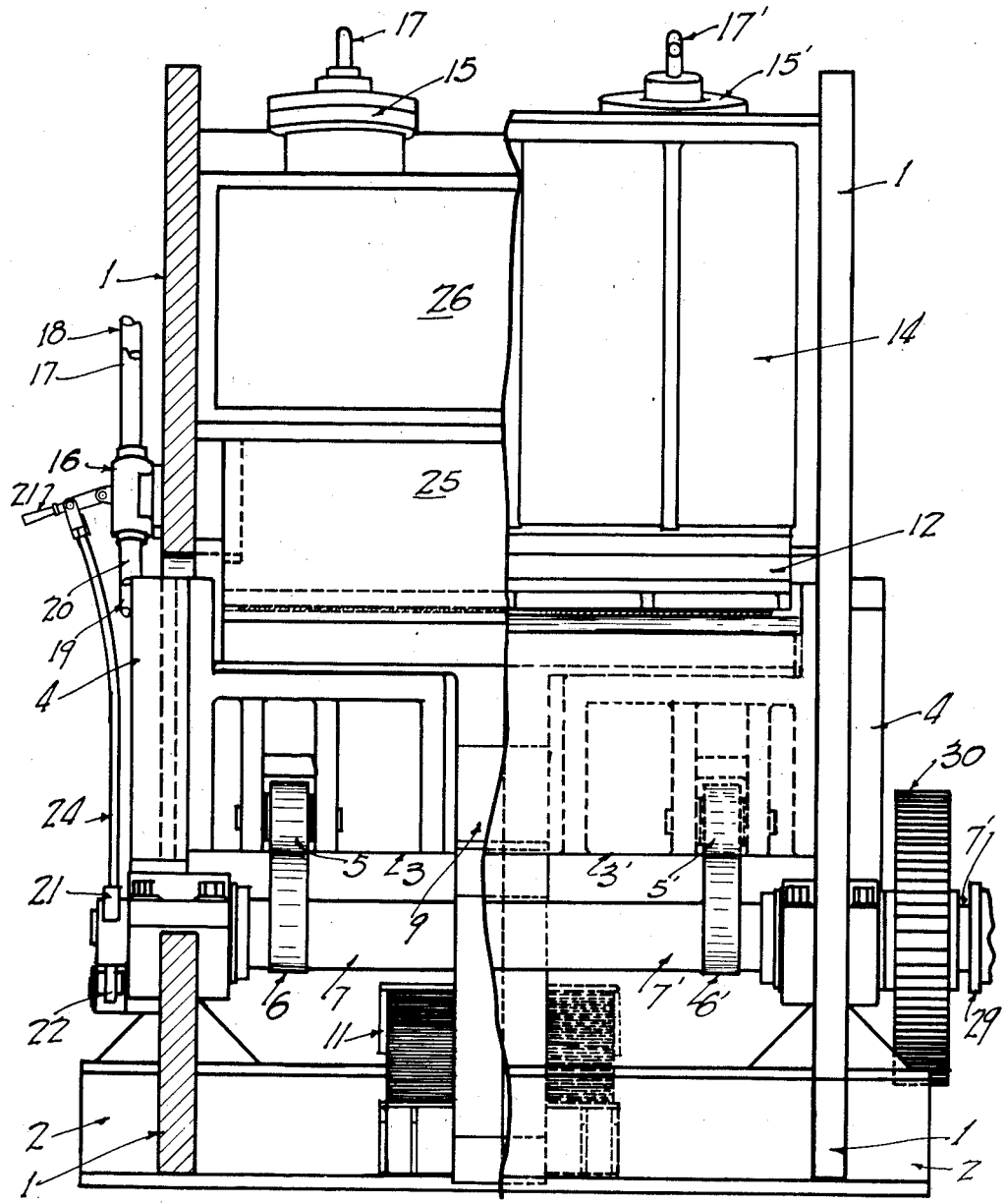
Fig. 2 is an elevation seen from the right of Fig. 1 partly in section along the center line of the machine.

Referring now more particularly to Fig. 1, I have shown a chassis consisting of housings 1 and 1 suitably welded or otherwise attached to the base cross members 2 and 2. The housings 1 are provided with converging windows 1'. Welding anvils 3 and 3' are mounted for reciprocating movement on the converging surfaces 1'' of the windows 1' and are held in contact with the housings by means of the side clamps 4. The anvils 3 and 3' are provided with rollers 5 and 5' respectively, which engage the cams 6 and 6' mounted respectively on the shafts 7 and 7'. It will be clear that as the shafts 7 and 7' are rotated, a movement upward or downward along converging paths will be imparted to the anvils 3 and 3'.

The electrodes 8 and 8' are mounted upon copper contact plates or transformer leads 9 and 9' which are suitably insulated from the anvils 3 and 3' by insulation 10. A welding transformer 11 is connected to the leads 9 and 9' in conventional manner.

Since the mechanisms connected with the anvils 3 and 3' are generally identical, I will henceforth describe the mechanism shown on the left side of Fig. 1, it being understood that similar mechanism is found on the right-hand side. Cooperating with the electrode 8 is a clamp member 12 fastened to a head 13 which is slidably mounted in guides 14. The head 13 is actuated by means of a hydraulic cylinder 15, which is provided with a four-way valve 16. The stroke of the piston of the cylinder 15 is equal to the clamping travel plus the cam travel. A conduit 17 is provided above the piston and a conduit 18 entering the cylinder below the piston, so that pressure applied through the conduit 17 urges the clamp downward, whereas pressure applied through the conduit 18 urges the clamp upward. The conduit 19 is connected to the hydraulic supply and the conduit 20 is the discharge line. The valve 16 is manually operable by means of a lever 21 and is also mechanically operable by means of the cam 21 and roller 22, lever 23 and push rod 24, to raise the members 13 and 13' when the anvils 3 and 3' are urged upwardly by their respective cams 6 and 6'. It will be understood that a complete and separate hydraulic system (operating from a single hydraulic supply) is provided for each side to operate the members 13 and 13' as described.

Mounted midway between the electrodes 8 and 8' is an end gauge 25 which extends across the width of the machine. This gauge is firmly fixed to a separator 26 as shown. This gauge, as will be clear from a consideration of Fig. 1, is tapered or of wedge shape cross section so that as the clamped ends of the strip are brought downward along converging paths the gauge will not provide interference. The transformer 11 is connected in the usual manner except that provision is made by means of limit switches or in any desired manner to energize the transformer after the strip has cleared the gauge 25 in its downward travel.

Figure 3:
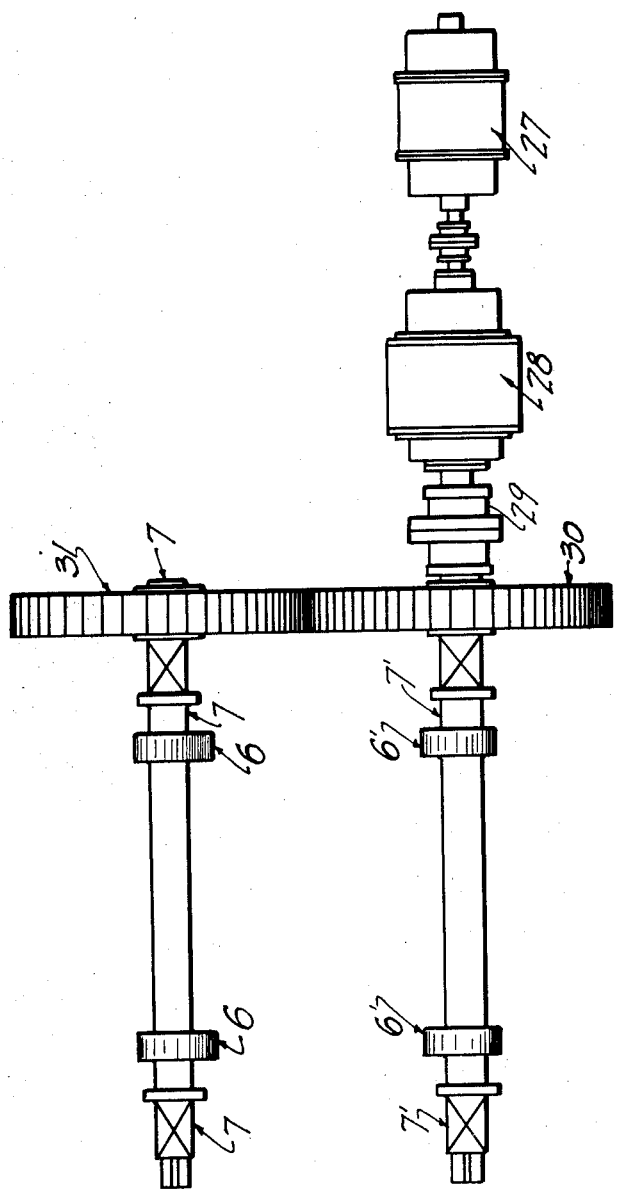
Fig. 3 is a diagrammatic representation in plan of the cam shaft drive.

As shown in Fig. 3, the shafts 7 and 7', of which the cams 6 and 6' are integral parts are driven by a variable speed motor 27 through a reduction gearing arrangement indicated generally at 28, and a coupling 29. Provision is made by means of the gears 30 and 31 having equal diameters for driving the shafts 7 and 7' at equal speeds and in opposite directions.

Figure 4:
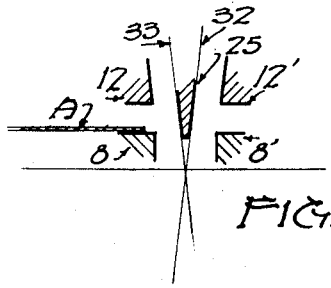
Figure 8:
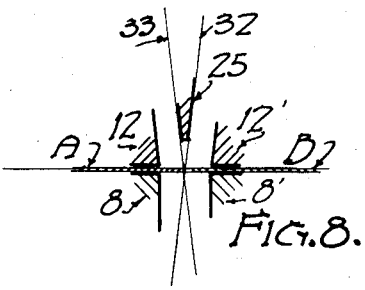
Figure 5:
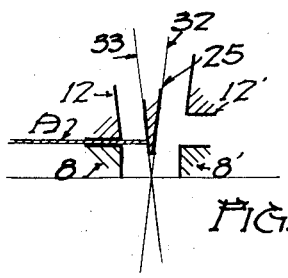
Figure 9:
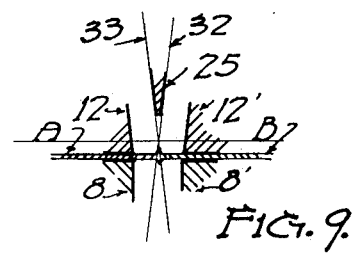
Figure 6:
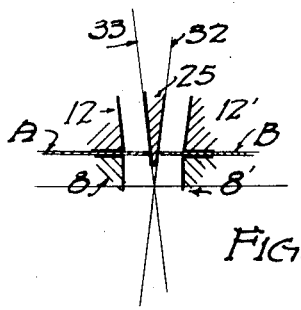
Figure 10:
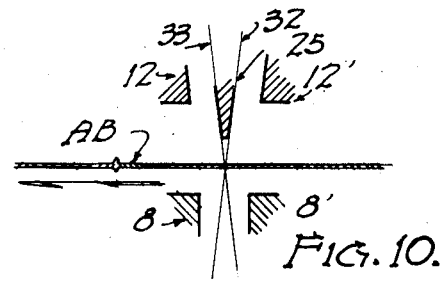
Figure 7:
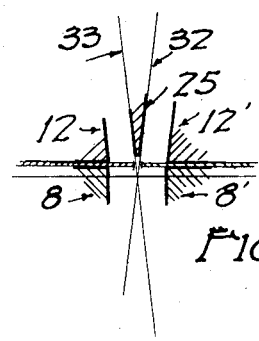

Coming now to a consideration of Figs. 4 to 10 inclusive, I will describe the operation of the machine. The tail end of the preceding strip A is brought in between the anvil and clamp, as shown in Fig. 4, and brought squarely against the gauge 25, as shown in Fig. 5. The clamp 12 is then moved to clamping position by an operation of the lever 21. Then the leading edge of the following strip B is likewise brought against the gauge 25 and the clamp 12' is moved into clamping position by an actuation of the lever 21'. This situation is shown in Fig. 6. The strips A and B are now properly positioned and the motor 27 is energized so as to cause rotation of the cam shafts 7 and 7', allowing the anvils 3 and 3' to descend along the converging paths, which paths for the strip ends are indicated in Figs. 4 to 10 inclusive at 32 and 33. After the gauge 25 is cleared, which situation is shown in Fig. 7, the transformer 11 is energized so as to cause arcing between the strip ends A and B, for heating the latter to welding temperature. As shown in Fig. 8, the strip ends make contact at the point of intersection of the converging lines 32 and 33, and as the anvils 3 and 3' descend further the final push-up or forging action is brought about below the intersection of the lines 32 and 33, as shown in Fig. 9. At this point the weld is completed and the clamps 12 and 12' are automatically released by means of the cams 21 and 21', as above described, and these clamps return to full open position. A limit switch may be provided to stop the motor 27 at the point indicated, for example in Fig. 10, and the strip may then be drawn through for the next weld. At that time the electrodes are again returned to receiving position for the next weld as shown in Fig. 4.

It should be understood that various modifications may be made in this machine without departing from the spirit of my invention, and it will be clear that I do not intend to limit myself otherwise than as pointed out in the claims which follow.

Having now fully described my invention, what I claim as new and desire to secure by Letters Patent is:

1. In a welding machine, a pair of spaced anvils mounted for reciprocating movement along converging paths, a pair of clamping jaws cooperating with said anvils for clamping material to be welded, and a fixed gauge extending between said anvils whereby material to be welded may be properly positioned prior to clamping, said gauge being tapered in the direction of movement of said anvils, whereby as the said anvils move along their converging paths, the material to be welded will clear said gauge.

2. An electric welding machine having opposed pairs of clamping jaws movable along converging paths, and a fixed spacing gauge disposed between said pairs of jaws near the position of greatest spacing between said pairs of jaws.

3. An electric welding machine having opposed pairs of clamping jaws movable along converging paths, and a fixed tapered spacing gauge disposed between said pairs of jaws, the taper of said gauge corresponding generally to the convergence of said paths, and said gauge terminating short of the intersection of the planes of the faces thereof.

4. An electric welding machine having a frame, converging sloping surfaces in said frame, anvils mounted for reciprocating movement along said surfaces, cam followers on said anvils, cams for cooperating with said followers to produce said reciprocating movement, driving means for said cams, power actuated clamping elements cooperating with said anvils, a fixed tapered spacing gauge disposed between said anvils at that end of the movement thereof at which said anvils are farthest separated, said gauge extending only a relatively short distance in the direction of movement of said anvils, whereby material to be welded, clamped between said respective anvils and clamping elements and abutting said gauge, will clear said gauge during the converging movement of said anvils and clamping elements.

5. An electric welding machine having a frame, converging sloping surfaces in said frame, anvils mounted for reciprocating movement along said surfaces, means for causing reciprocation of said anvils, means for clamping work to be welded on said anvils, a fixed tapered spacing gauge disposed between said anvils at that end of the movement thereof at which said anvils are farthest separated, said gauge extending only a relatively short distance in the direction of movement of said anvils, whereby work to be welded, clamped onto said anvils and abutting said gauge, will clear said gauge during the early portion of the converging movement of said anvils.

6. In a welding machine, a pair of spaced anvils mounted for reciprocating movement along converging paths, a pair of clamping jaws cooperating with said anvils for clamping material to be welded, hydraulic pressure means for operating said clamping jaws, and a fixed gauge extending between said anvils whereby material to be welded may be properly positioned prior to clamping, said gauge being tapered in the direction of movement of said anvils, whereby as said anvils move along their converging paths, the material to be welded will clear said gauge.

7. In a welding machine, a pair of spaced anvils mounted for reciprocating movement along converging lines, a pair of clamping jaws cooperating with said anvils for clamping material to be welded, a fixed gauge extending between said anvils whereby material to be welded may be properly positioned prior to clamping, power means for moving said anvils and jaws along their converging paths whereby the adjacent ends of the material to be welded will travel along converging lines, said power means being arranged to move said anvils and jaws to such an extent that the ends of the material to be welded will pass the point of convergence of their respective paths, and means for applying electric current to the material to be welded before said point of convergence is reached.

8. In a welding machine, a pair of spaced anvils mounted for reciprocating movement along converging lines, a pair of clamping jaws cooperating with said anvils for clamping material to be welded, a fixed gauge extending between said anvils whereby material to be welded may be properly positioned prior to clamping, said gauge being tapered in the direction of movement of said anvils, whereby as the said anvils move along their converging paths, the material to be welded will clear said gauge, power means for moving said anvils and jaws along their converging paths whereby the adjacent ends of the material to be welded will travel along converging lines, said power means being arranged to move said anvils and jaws to such an extent that the ends of the material to be welded will pass the point of convergence of their respective paths, and means for applying electric current to the material to be welded before said point of convergence is reached.

9. An electric welding machine having opposed pairs of clamping jaws movable along converging paths from a position above the normal plane of passage of material to be welded to a position below said plane, said paths being such that the loci of the ends of material held in said jaws will cross substantially at the said plane, and means for applying force to said pairs of jaws to move them along said paths.

EDWIN B. HUDSON.